(12) United States Patent
Choi et al.

(10) Patent No.: US 8,773,076 B2
(45) Date of Patent: Jul. 8, 2014

(54) BATTERY MANAGEMENT SYSTEM, METHOD OF REMOVING POLARIZATION VOLTAGE OF BATTERY, AND ESTIMATING STATE OF CHARGE OF BATTERY

(75) Inventors: Loo-Ney Choi, Yongin-si (KR); Ki-Ho Seo, Yongin-si (KR); Yusai Murakami, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 461 days.

(21) Appl. No.: 13/244,407

(22) Filed: Sep. 24, 2011

(65) Prior Publication Data

US 2012/0200264 A1    Aug. 9, 2012

(30) Foreign Application Priority Data

Feb. 9, 2011   (KR) .................. 10-2011-0011634

(51) Int. Cl.
 *H01M 10/44*   (2006.01)
 *H01M 10/46*   (2006.01)
 *H02J 7/00*    (2006.01)

(52) U.S. Cl.
 CPC ....................... *H02J 7/00* (2013.01)
 USPC ........................................................ 320/139

(58) Field of Classification Search
 CPC ........... H02J 7/00; H02J 7/007; H02J 7/0008; H02J 7/0047; H02J 7/0091; H02J 7/0093
 USPC .................. 320/128, 129, 132, 139, 145, 150
 See application file for complete search history.

(56) References Cited

U.S. PATENT DOCUMENTS

| | | | |
|---|---|---|---|
| 7,355,411 B2 | 4/2008 | Murakami et al. | |
| 7,362,074 B2 | 4/2008 | Iwane et al. | |
| 7,456,612 B2 | 11/2008 | Murakami | |
| 7,554,295 B2 * | 6/2009 | Melichar | 320/132 |
| 7,679,328 B2 | 3/2010 | Mizuno et al. | |
| 2004/0183508 A1 * | 9/2004 | Toyoda et al. | 323/265 |

FOREIGN PATENT DOCUMENTS

| | | |
|---|---|---|
| JP | 2010-156702 | 7/2010 |
| KR | 10-2004-0060921 | 7/2004 |
| KR | 10-2005-0032492 | 4/2005 |
| KR | 1020060110832 A | 10/2006 |
| KR | 10-2007-0045135 | 5/2007 |
| KR | 1020070045135 A | 5/2007 |
| KR | 1020090094006 A | 9/2009 |

OTHER PUBLICATIONS

KIPO Office action dated Apr. 23, 2012, for Korean priority Patent application 10-2011-0011634, (4 pages).
Korean Patent Office Notice of Allowance dated Nov. 20, 2012 for Korean Patent Application No. 10-2011-0011634, 5 pgs.

* cited by examiner

*Primary Examiner* — Edward Tso
(74) *Attorney, Agent, or Firm* — Christie, Parker & Hale, LLP

(57) ABSTRACT

A battery management system according to an exemplary embodiment of the present invention includes: a current measuring unit for sampling a charge current and a discharge current of a battery; a charge and discharge amount calculator for calculating a charge and discharge amount corresponding to a difference between the sampled charge current and the sampled discharge current; a polarization voltage calculator for calculating a polarization voltage corresponding to the charge and discharge amount and a temperature of the battery; and a pulse generator for applying a polarization voltage reset pulse for the battery to remove the polarization voltage.

18 Claims, 15 Drawing Sheets

BATTERY MANAGEMENT SYSTEM, METHOD OF REMOVING POLARIZATION VOLTAGE OF BATTERY, AND ESTIMATING STATE OF CHARGE OF BATTERY

CROSS-REFERENCE TO RELATED APPLICATION

This application claims priority to and the benefit of Korean Patent Application No. 10-2011-0011634, filed in the Korean Intellectual Property Office on Feb. 9, 2011, the entire content of which is incorporated herein by reference.

BACKGROUND

1. Field

The following description relates to a battery management system, a method of removing a battery polarization voltage, and a method of estimating a battery charge state.

2. Description of Related Art

Recently, the European Union has decided upon a plan to expand the percentage of renewable energy, from among all electric power sources, up to 20% by the year 2020 and 50% by the year 2050. The United States of America is also planning to carry out Renewable Portfolio Standards (RPS). In a situation where renewable energy increases from less than 5% in today's energy use to be up to 30 to 40% in the future, power systems should be prepared for these new changes.

It is not easy to control the amount of generation of renewable energy. This is because the amount of generation of renewable energy varies according to natural conditions, such as solar light, wind power, and wave power. Research is being done on a scheme that is capable of overcoming degradation in power quality of a power system and a mismatch between production and consumption times, which can be generated due to a shift in renewable energy generation. Power quality is evaluated on the basis of voltage and frequency. If the supply quantity of renewable energy does not coincide with the demand quantity of renewable energy in real time, abnormalities are generated in voltage and frequency, thereby possibly deteriorating the power quality of all of the power systems.

A power storage system has been in the spotlight as an alternative that is capable of managing such a shift in renewable energy. This is because the power storage system can efficiently coordinate (or control) demand and supply by charging electricity when the amount of generation of renewable energy is high and discharging electricity when the consumption of renewable energy is high.

Power storage techniques include pumping-up power generation, compressed air energy storage (CAES), a flywheel technique, superconducting magnetic energy storage (SMES), rechargeable battery storage, and so on. The pumping-up power generation technique is a method of generating electricity by rotating a turbine by pumping water into a dam when excess electricity is available and discharging water from the dam when the amount of electricity is insufficient. The CAES technique is a method of generating electricity by compressing air in the ground or sea and then discharging the air as occasion demands. The flywheel technique is a method of generating electricity by rotating a top when excess electricity is available and rotating a power generator using the top when electricity is insufficient. The SMES technique is a method using a principle that current is stored in a superconducting coil having resistance of 0. The rechargeable battery is a battery that can be repeatedly charged and discharged, and has been used as an uninterruptible power supply (UPS) for temporarily supplying electricity upon a power failure. The rechargeable battery has recently been in the spotlight as an auxiliary power source for renewable energy.

The power storage system not only stores the generated power of the renewable energy to the large capacity rechargeable battery (hereinafter referred to as a battery) among a plurality of rechargeable batteries which are connected to each other, but is also in cooperation with a common grid to store the power of the common grid to the battery, or may supply the power stored in the battery to the common grid or the generated power of the renewable energy to the common grid. As described above, while the battery repeatedly charges and discharges the power in the power storage system, the battery executes an essential function of recovering a time of producing and consuming power that are important characteristics of the power storage system.

To improve an efficiency of the battery in which the charge and discharge of the battery is repeated, a state of charge (hereafter referred to as SOC) should be accurately estimated. The SOC of the battery may be estimated by measuring the voltage, however the voltage of the battery may not be accurately measured because of the polarization voltage that is generated in the process of charge and discharge. The SOC of the battery may be estimated by measuring the current, however there is a limitation in that an initial SOC of the battery must be recognized for the SOC estimation using the current measuring.

A method of more accurately estimating the SOC of the battery by quickly removing the polarization voltage generated according to the charge and discharge of the battery is needed.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention are directed toward a battery management system for quickly removing a polarization voltage generated according to charge and discharge of a battery to more accurately estimate a charge state of the battery, a method of removing a battery polarization voltage, and a method of estimating a battery charge state.

A battery management system according to an exemplary embodiment of the present invention includes: a current measuring unit for sampling a charge current and a discharge current of a battery; a charge and discharge amount calculator for calculating a charge and discharge amount corresponding to a difference between the sampled charge current and the sampled discharge current; a polarization voltage calculator for calculating a polarization voltage corresponding to the charge and discharge amount and a temperature of the battery; and a pulse generator for applying a polarization voltage reset pulse for the battery to remove the polarization voltage.

The charge and discharge amount calculator may be configured to calculate the charge and discharge amount during a charge and discharge driving period in which charging or discharging of the battery is executed, and the pulse generator may be configured to generate the polarization voltage reset pulse during a polarization voltage reset period after the charge and discharge driving period.

The battery management system may further include a voltage measuring unit for measuring an opening voltage of the battery after the polarization voltage reset period.

The battery management system may further include a state of charge (SOC) estimating unit for estimating a charge state according to the opening voltage and the temperature of the battery.

The battery management system may further include a temperature measuring unit for measuring and transmitting the temperature of the battery to the polarization voltage calculator and the SOC estimating unit.

The battery management system may further include a switching unit for coupling the battery and an external device during the charge and discharge driving period and uncoupling the battery and the external device during the polarization voltage reset period.

The battery management system may further include a power converter for converting a first device power into a charge power of the battery and for converting a discharge power of the battery into a second device power.

A method for removing a battery polarization voltage according to another exemplary embodiment of the present invention includes: measuring a current flowing in a battery; calculating a charge and discharge amount of the battery corresponding to a difference between a charge current and a discharge current flowing in the battery; calculating the battery polarization voltage corresponding to the charge and discharge amount and a temperature of the battery; and applying a polarization voltage reset pulse to remove the battery polarization voltage for the battery.

The current flowing in the battery may be measured during a charge and discharge driving period in which charging or discharging is executed in the battery.

The charge and discharge amount of the battery may be calculated at an ending time of the charge and discharge driving period.

The calculating of the polarization voltage may include measuring the temperature of the battery.

The polarization voltage reset pulse may be applied as a negative polarization voltage reset pulse when the battery polarization voltage is positive, and may be applied as a positive polarization voltage reset pulse when the battery polarization voltage is negative.

The polarization voltage reset pulse may be applied as a plurality of pulses.

The plurality of pulses may be generated by applying at least one of a plurality of pulse widths, a plurality of pulse magnitudes, or a plurality of pulse cycles.

A method of estimating a battery charge state according to another exemplary embodiment of the present invention includes: calculating a polarization voltage generated in the battery by calculating a charge and discharge amount of the battery during a charge and discharge driving period in which charging or discharging of the battery is executed; applying a polarization voltage reset pulse for the battery to remove the polarization voltage during a polarization voltage reset period after the charge and discharge driving period; and measuring an opening voltage of the battery during a non-activation period after the polarization voltage reset period, to estimate the battery charge state.

The polarization voltage reset pulse may be applied as a negative polarization voltage reset pulse when the polarization voltage is positive, and may be applied as a positive polarization voltage reset pulse when the polarization voltage is negative.

The polarization voltage reset pulse may be applied as a plurality of pulses.

The plurality of pulses may be generated by applying at least one of a plurality of pulse widths, a plurality of pulse magnitudes, or a plurality of pulse cycles.

The polarization voltage generated according to the charge and discharge of the battery may be quickly removed, and the SOC of the battery may be more accurately estimated.

DETAILED DESCRIPTION

Figure 1:
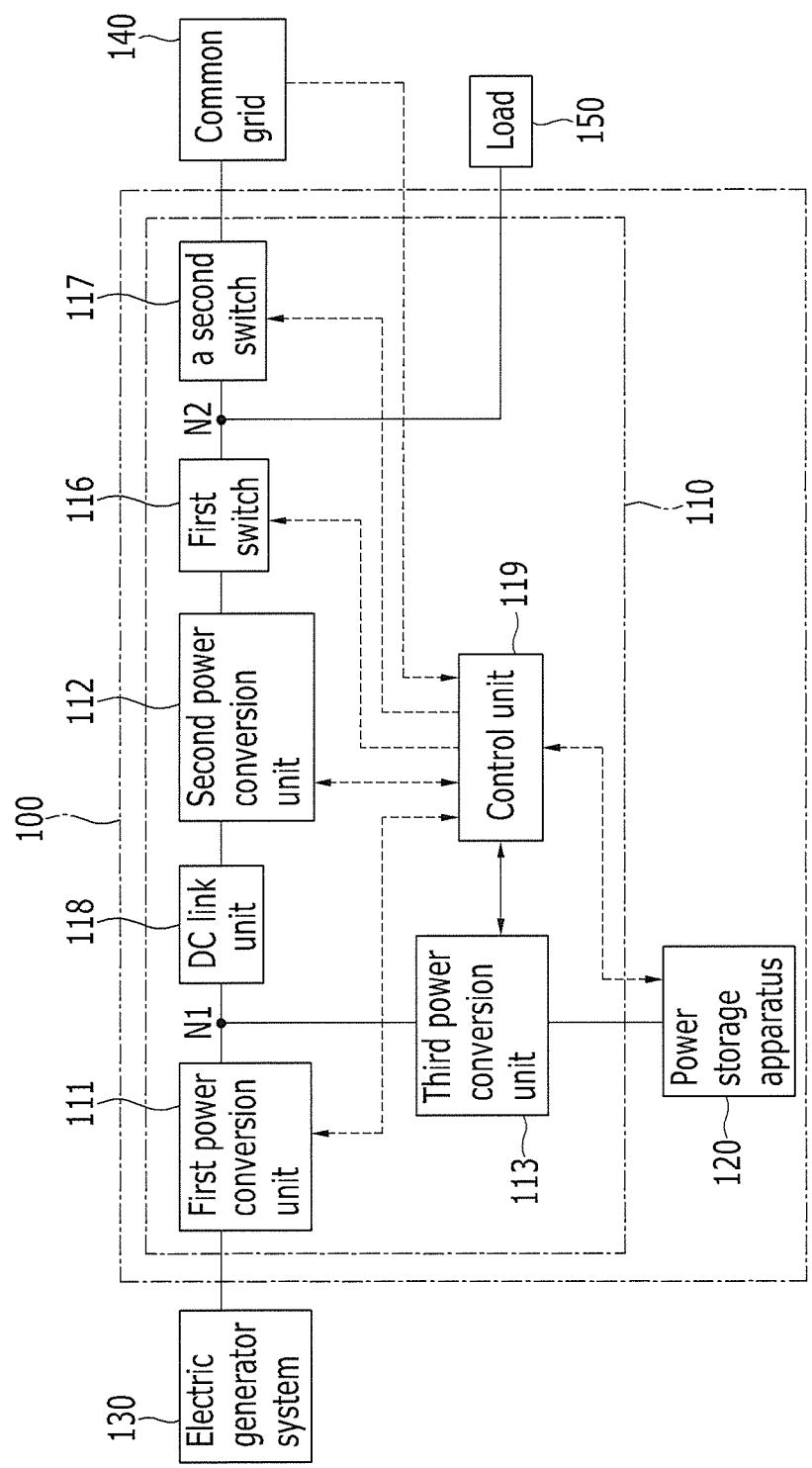
FIG. 1 is a block diagram of a grid-tied power storage system according to an exemplary embodiment of the present invention.

Hereinafter, some exemplary embodiments of the present invention are described in detail with reference to the accompanying drawings in order for those skilled in the art to be able to readily practice the exemplary embodiments.

Furthermore, in some exemplary embodiments, constituent elements having the same construction are assigned the same reference numerals and are described in connection with an initial exemplary embodiment as a representative example. In the remaining exemplary embodiments, only constituent elements different from those of the initial exemplary embodiment are described.

In order to clarify description of the present invention, parts not related to the description are omitted, and the same reference numbers are used throughout the drawings to refer to the same or like parts.

Throughout this specification and the claims that follow, when it is described that an element is "coupled" to another element, the element may be "directly coupled" to the other element or "electrically coupled" to the other element through a third element therebetween. In addition, unless explicitly described to the contrary, the word "comprise" and variations such as "comprises" or "comprising" will be understood to imply the inclusion of stated elements but not the exclusion of any other elements.

FIG. 1 is a block diagram of a grid-tied power storage system according to an exemplary embodiment of the present invention.

Referring to FIG. 1, a grid-tied power storage system 100 includes a power management system 110 and a power storage apparatus 120.

The grid-tied power storage system 100 is connected to an electric generator system 130, a common grid 140, and a load 150.

The electric generator system (or power generation system) 130 includes a system for producing electrical energy by using renewable energy, such as solar light, wind power, wave power, tidal power, and geothermal power. For example, a solar power generation system includes a solar cell module in which a plurality of solar cells for converting solar lighting into electrical energy are coupled in series or in parallel.

The common grid 140 includes a power station for producing electric power by using heating power, waterpower, or atomic power generation, and a substation or a power transmission site for changing the properties of a voltage or current in order to transmit the produced power through a transmission line or a distribution line.

The load 150 refers to various suitable electrically driven devices that consume power. For example, the load can include consumer electronics and production facilities at factories.

The power management system 110 is a system for associating with power grids, such as with power of the electric generator system (or power generation system) 130, power of the common grid 140, and power of the power storage apparatus 120. The power management system 110 can manage a temporal mismatch between production and consumption times of a power grid by using the power storage apparatus 120.

The power storage apparatus 120 includes a rechargeable battery that can be repeatedly charged and discharged. In one embodiment, the rechargeable battery includes a nickel-cadmium battery, a lead-acid battery, a nickel-hydrogen battery, a lithium-ion battery, a lithium polymer battery, and so on. The power storage apparatus 120 may be a high-capacity storage device in which a plurality of rechargeable batteries are connected in parallel or in series. Hereafter, a large capacity rechargeable battery including a plurality of rechargeable batteries that are connected to each other can be referred to as a battery for ease of description.

Meanwhile, a battery management system (hereinafter referred to as a "BMS") for controlling the charge and discharge of a battery may be included in the power storage apparatus 120 or the power management system 110. The BMS functions to protect the rechargeable battery from overcharge, over-discharge, overcurrent, or overheating by detecting a voltage, current, or temperature of the cell and monitoring a state of charge (hereinafter referred to as "SOC") and state of health (hereinafter referred to as "SOH") of the cell.

The battery management system removes the polarization voltage generated in the battery according to the charge and discharge of the battery and estimates the SOC of the battery. For example, the battery management system measures the current of the battery to calculate the charge and discharge amount of the battery. The battery management system calculates the polarization voltage of the battery by using the calculated charge and discharge amount and applies a polarization voltage reset pulse for the battery to remove the polarization voltage generated in the battery. The battery management system calculates the opening circuit voltage (or OCV) of the battery after the polarization voltage of the battery is removed by the polarization voltage reset pulse and estimates the SOC of the battery by using the calculated OCV.

The power management system 110 includes a first power conversion unit 111, a second power conversion unit 112, a third power conversion unit 113, a first switch 116, a second switch 117, a DC link unit 118, and a control unit 119.

The first power conversion unit 111 is connected to the electric generator system (or power generation system) 130 and is configured to convert a first power generated by the electric generator system (or power generation system) 130 into a second power, and transfer the second power to a first node N1. The first power generated by the electric generator system (or power generation system) 130 may be DC power or AC power. The second power of the first node N1 is DC power. That is, the first power conversion unit 111 may play a role of a converter for converting the first power in the form of DC power into the second power having another magnitude, or an inverter for converting the first power in the form of AC power into the second power in the form of DC power. The first power conversion unit 111 performs maximum power point tracking (hereinafter referred to as "MPPT") control for maximizing power generated by the electric generator system (or power generation system) 130. That is, the first power conversion unit 111 may be an MPPT converter having a maximum power point tracking function.

The DC link unit 118 is connected to the first node N1, and is configured to maintain a voltage level of the first node N1 at a DC link voltage level. The DC link unit 118 prevents or protects from a voltage level of the first node N1 from becoming unstable because of a shift in the output voltage of the electric generator system (or power generation system) 130, an instant voltage drop of the common grid 140, or the generation of a maximum load of the load 150. Consequently, the second power conversion unit 112 and the third power conversion unit 113 can be normally operated. The DC link unit 118 may be a capacitor for a DC link connected in parallel between the first node N1 and the second power conversion unit 112. An aluminum electrolytic capacitor, a polymer capacitor, or a multi-layer ceramic capacitor may be used as the capacitor for the DC link.

The second power conversion unit 112 is connected between the first node N1 and the second node N2. The common grid 140 and the load 150 are connected to the second node N2. The second power conversion unit 112 converts the DC power of the first node N1 into AC power and transfers the AC power to the second node N2. Furthermore, the second power conversion unit 112 converts AC power of the second node N2 into DC power and transfers the DC power to the first node N1. That is, the second power conversion unit 112 can play the role of a bi-directional inverter for converting the DC power of the first node N1 and the AC power of the second node N2 in both directions. AC power to be supplied to the common grid 140 and the load 150 or AC power supplied from the common grid 140 is formed in the second node N2.

The third power conversion unit 113 is connected between the first node N1 and the power storage apparatus 120. The third power conversion unit 113 converts the second power in the form of DC power supplied from the first node N1 into a third power in the form of DC power to be stored in the power storage apparatus 120, and transfers the third power in the form of DC power to the power storage apparatus 120. Furthermore, the third power conversion unit 113 converts the third power in the form of DC power supplied from the power storage apparatus 120 into the second power in the form of DC power, and transfers the second power in the form of DC power to the first node N1. That is, the third power conversion unit 113 can play the role of a bi-directional converter for converting the DC power of the first node N1 and the DC power of the power storage apparatus 120 in both directions.

The first switch 116 is connected between the second power conversion unit 112 and the second node N2, and is configured to cut off the flow of power between the second power conversion unit 112 and the second node N2. The second switch 117 is connected between the second node N2 and the common grid 140, and is configured to cut off the flow of power between the second node N2 and the common grid 140. A field effect transistor (FET), a bipolar junction transistor (BJT), or the like may be used as the first switch 116 and the second switch 117.

In particular, when an abnormality is generated in the common grid 140, the second switch 117 cuts off the supply of power to the common grid 140 and implements an independent operation of the grid-tied power storage system 100. When the second switch 117 is opened, the grid-tied power storage system 100 is separated from the common grid 140 and thus can be independently operated by the power of the electric generator system (or power generation system) 130 and the power storage apparatus 120. Accordingly, the common grid 140 can be prevented or protected from being operated in an abnormal state by utilizing power output from the grid-tied power storage system 100.

The control unit 119 controls the general operation of the power management system 110. The control unit 119 receives information (e.g., sensing signals related to voltage, current, and temperature) regarding power generated by the electric generator system (or power generation system) 130 from the first power conversion unit 111, power storage information including SOC, SOH, etc. from the power storage apparatus 120 (or a BMS), and grid information including voltage, current, temperature, etc. of a grid, from the common grid 140. The control unit 119 controls an operating mode of the power management system 110 on the basis of the information about power generated by the electric generator system (or power generation system) 130, the power storage information of the power storage apparatus 120, and the grid information of the common grid 140. Furthermore, the control unit 119 receives sensing signals related to voltage, current, and temperature from the first power conversion unit 111, the second power conversion unit 112, and the third power conversion unit 113, and controls the power conversion efficiency of each of the power conversion units 111, 112, and 113 according to an operating mode of the power management system 110. The control unit 119 controls the on and off of the first switch 116 and the second switch 117 according to an operating mode of the power management system 110.

The operating mode of the power management system 110 can be classified according to a power supply method between two or more of the power storage apparatus 120, the electric generator system (or power generation system) 130, the common grid 140, and the load 150. The operating mode of the power management system 110 includes (1) the supply of power from the electric generator system (or power generation system) 130 to the power storage apparatus 120, (2) the supply of power from the electric generator system (or power generation system) 130 to the common grid 140, (3) the supply of power from the electric generator system (or power generation system) 130 to the load 150, (4) the supply of power from the power storage apparatus 120 to the common grid 140, (5) the supply of power from the power storage apparatus 120 to the load 150, (6) the supply of power from the common grid 140 to the power storage apparatus 120, and (7) the supply of power from the common grid 140 to the load 150.

When power is supplied from the electric generator system (or power generation system) 130 to the power storage apparatus 120, the control unit 119 transmits an off signal to the first switch 116, thereby cutting off the flow of the power from the first node N1 to the second node N2. The first power generated by the electric generator system (or power generation system) 130 is converted into the second power in the form of DC power by the first power conversion unit 111. Voltage of the second power is stabilized at a DC link voltage level by the DC link unit 118. The second power stabilized at the DC link voltage level is converted into the third power in the form of DC power by the third power conversion unit 113 and then supplied to the power storage apparatus 120, thereby charging the battery. The power storage apparatus 120 applies the polarization voltage reset pulse for the battery after the battery is charged, and thereby the polarization voltage generated in the battery during the charging process of the battery may be removed and the SOC of the battery may be more accurately estimated.

(2) When power is supplied from the electric generator system (or power generation system) 130 to the common grid 140, the control unit 119 transmits an off signal to the third power conversion unit 113, thereby cutting off the flow of the power from the first node N1 to the power storage apparatus 120. The control unit 119 transmits an on signal to the first switch 116 and the second switch 117. The first power generated by the electric generator system (or power generation system) 130 is converted into the second power in the form of DC power by the first power conversion unit 111. Voltage of the second power is stabilized at a DC link voltage level by the DC link unit 118. The second power stabilized at the DC link voltage level is converted into AC power by the second power conversion unit 112 and then supplied to the common grid 140. Here, the second power conversion unit 112 outputs the AC power which conforms to power quality criteria, such as the total harmonic distortion (THD), power factor, etc., of voltage and current for the common grid 140.

(3) When power is supplied from the electric generator system (or power generation system) 130 to the load 150, the control unit 119 transmits an off signal to the third power conversion unit 113 and the second switch 117, thereby cutting off the flow of the power from the first node N1 to the power storage apparatus 120 and the common grid 140. The control unit 119 transmits an on signal to the first switch 116. The first power generated by the electric generator system (or power generation system) 130 is converted into the second power in the form of DC power by the first power conversion unit 111. Voltage of the second power is stabilized at a DC link voltage level by the DC link unit 118. The second power stabilized at the DC link voltage level of the first node N1 is converted into AC power by the second power conversion unit 112 and then supplied to the load 150. The load 150 may use AC power. The second power conversion unit 112 outputs AC power that is used in the load 150 and conforms to power quality criteria for the load 150.

(4) When power is supplied from the power storage apparatus 120 to the common grid 140, the control unit 119 transmits an on signal to the first switch 116 and the second switch 117. DC power at an output voltage level, outputted by the power storage apparatus 120, is converted into DC power at a DC link voltage level by the third power conversion unit 113 and then stabilized by the DC link unit 118. The power stabilized at the DC link voltage level of the first node N1 is converted into AC power by the second power conversion unit 112 and then supplied to the common grid 140. The power storage apparatus 120 applies the polarization voltage reset pulse for the battery after the battery is discharged, and thereby the polarization voltage generated in the battery during the discharging process of the battery may be removed and the SOC of the battery may be more accurately estimated.

(5) When power is supplied from the power storage apparatus 120 to the load 150, the control unit 119 transmits an on signal to the first switch 116 and transmits an off signal to the second switch 117. DC power at an output voltage level, outputted by the power storage apparatus 120, is converted into DC power at a DC link voltage level by the third power conversion unit 113 and then stabilized by the DC link unit 118. The power stabilized at the DC link voltage level of the first node N1 is converted into AC power by the second power conversion unit 112 and then supplied to the load 150. The power storage apparatus 120 applies the polarization voltage reset pulse for the battery after the battery is discharged, and thereby the polarization voltage generated in the battery during the discharging process of the battery may be removed and the SOC of the battery may be more accurately estimated.

(6) When power is supplied from the common grid 140 to the power storage apparatus 120, the control unit 119 transmits an on signal to the first switch 116 and the second switch 117. AC power of the common grid 140 is converted into DC power at a DC link voltage level by the second power conversion unit 112. The DC power at a DC link voltage level of the first node N1 is converted into DC power at a voltage level for storing power by the third power conversion unit 113 and then supplied to the power storage apparatus 120. The power storage apparatus 120 applies the polarization voltage reset pulse for the battery after the battery is charged, and thereby the polarization voltage generated in the battery during the charging process of the battery may be removed and the SOC of the battery may be more accurately estimated.

(7) When power is supplied from the common grid 140 to the load 150, the control unit 119 transmits an off signal to the first switch 116 and an on signal to the second switch 117. AC power of the common grid 140 is supplied to the load 150.

The operating mode of the power management system 110 has been illustrated and classified according to power supply methods among the power storage system 120, the electric generator system (or power generation system) 130, the common grid 140, and the load 150, but the power supply methods may be performed in combination. Accordingly, the operating mode of the power management system 110 may be configured in various suitable ways. For example, power may be supplied from the electric generator system (or power generation system) 130 to the power storage apparatus 120 and the load 150, or power may be supplied from the electric generator system (or power generation system) 130 and the power storage apparatus 120 to the load 150. In some embodiments, power may be supplied from the electric generator system (or power generation system) 130 and the power storage apparatus 120 to the common grid 140 and the load 150.

Next, a battery management system that is capable of quickly removing the polarization voltage generated in the battery according to the charge and discharge of the battery and more accurately estimating the SOC of the battery will be described.

Figure 2:
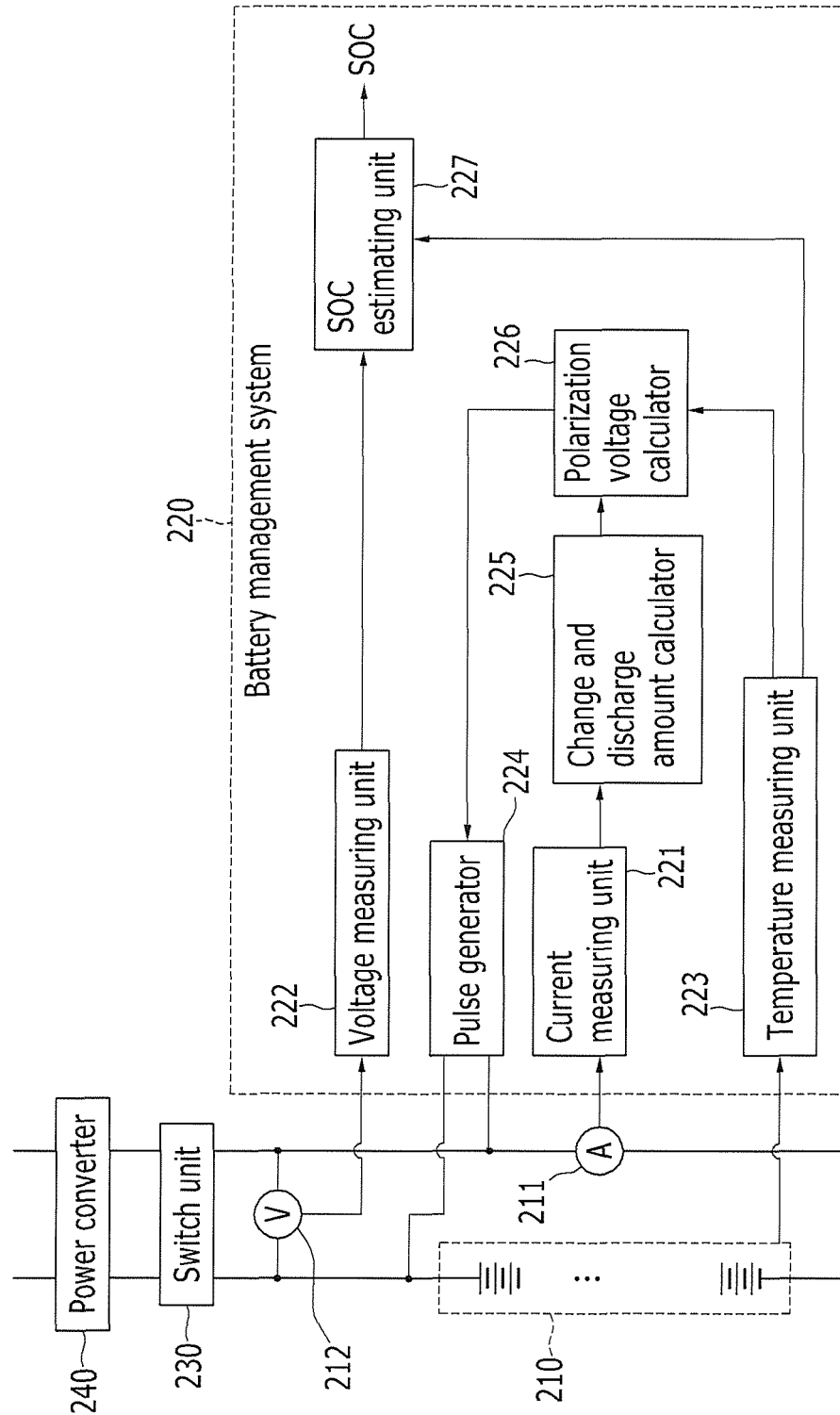
FIG. 2 is a block diagram of a battery management system according to an exemplary embodiment of the present invention.

FIG. 2 is a block diagram of a battery management system according to an exemplary embodiment of the present invention.

Referring to FIG. 2, a battery management system 220 is connected to a battery 210 to measure a current, a voltage, and a temperature of the battery 210 according to a charge and discharge of the battery 210, and to estimate the SOC of the battery 210.

The battery 210 includes a plurality of rechargeable batteries. In one embodiment, the plurality of rechargeable batteries are coupled in series, however the plurality of rechargeable batteries may be coupled in parallel. The positive terminal and the negative terminal of the battery 210 are connected to a power converter 240 through a switching unit (or switch unit) 230.

The power converter 240 converts the power applied from an external device (e.g., a first device power) into a power (e.g., a predetermined power) to charge the battery 210, and the power that is discharged from the battery 210 is converted into a power (e.g., a predetermined power) required in the external device (e.g., a second device power). The power applied from the external device may be AC power or DC power. The power discharged from the battery 210 is DC power. The power converter 240 may execute the role of the third power converter 113 included in the power management system 110 of FIG. 1. That is, the power converter 240 plays the role of a bi-directional converter for converting the DC power of the first node N1 of the power management system 110 and the DC power of the battery 210 in both directions.

The switching unit (or switch unit) 230 enters a closed state during a charge and discharge driving period in which the charge or discharge of the battery 210 is executed, such that the battery 210 and the external device are connected. The switching unit (or switch unit) 230 enters an opened state during a non-activation period in which the charge and discharge of the battery 210 is not executed, such that the connection of the battery 210 and the external device is prevented. The polarization voltage reset period to remove the polarization voltage of the battery 210 is included in the non-activation period of the battery 210.

The battery management system 220 includes a current measuring unit 221, a voltage measuring unit 222, a temperature measuring unit 223, a pulse generator 224, a charge and discharge amount calculator 225, a polarization voltage calculator 226, and an SOC estimating unit 227.

The current measuring unit 221 samples a charge current and a discharge current of the battery 210 that is measured in a current sensor 211. The current sensor 211 is connected to one of the positive terminal and the negative terminal of the battery 210, thereby measuring the charge current and the discharge current of the battery 210. The current measuring unit 221 may divide (or separate) the charge current and the discharge current flowing in the battery 210 during the charge and discharge driving period for sampling, and transmits the sampled charge current and discharge current to the charge and discharge amount calculator 225.

The voltage measuring unit 222 samples the terminal voltage of the battery 210 that is measured in a voltage sensor 212. The voltage sensor 212 is connected to the positive terminal and the negative terminal of the battery 210, thereby measuring the terminal voltage of the battery 210. The voltage measuring unit 222 may measure the terminal voltage of the battery 210 when the switching unit (or switch unit) 230 is in the opened state, and here the terminal voltage is an open circuit voltage (OCV) of the battery 210. The voltage measuring unit 222 transmits the OCV of the battery 210 to the SOC estimating unit 227.

The temperature measuring unit 223 measures the temperature of the battery 210 by using a temperature sensor implanted in the battery 210. The temperature measuring unit 223 transmits the temperature of the battery 210 for calculating the polarization voltage to the polarization voltage calculator 226 and the SOC estimating unit 227.

The pulse generator 224 generates the polarization voltage reset pulse to remove the polarization voltage generated during the charge and discharge driving period of the battery 210 for the battery 210. The pulse generator 224 generates the polarization voltage reset pulse during the polarization voltage reset period in which the switching unit (or switch unit) 230 is in the open state after the charge and discharge driving period. The pulse generator 224 may generate a positive pulse or a negative pulse corresponding to the level of the polarization voltage that is transmitted from the polarization voltage calculator 226. Various suitable types of polarization voltage reset pulses may be generated according to the pulse width, the magnitude of the pulse, or the cycle of the pulse.

The charge and discharge amount calculator 225 calculates the charge and discharge amount of the battery 210 during the charge and discharge driving period. The charge and discharge amount of the battery 210 may be calculated using the charge amount corresponding to the difference between the charge current and the discharge current. The charge and discharge amount calculator 225 transmits the charge and discharge amount of the battery 210 to the polarization voltage calculator 226.

The polarization voltage calculator 226 stores a polarization voltage characteristic curve according to the charge and discharge amount and the temperature of the battery 210. The polarization voltage characteristic curve represents the magnitude of the polarization voltage generated in the battery 210 according to the charge and discharge amount and the temperature of the battery 210. The polarization voltage calculator 226 may calculate the polarization voltage corresponding to the charge and discharge amount transmitted from the charge and discharge amount calculator 225 and the temperature of the battery 210 transmitted from the temperature measuring unit 223, by using the polarization voltage characteristic curve. The polarization voltage is increased according to the charging amount of the battery 210, and is decreased according to the discharging amount of the battery 210. The polarization voltage calculator 226 transmits the calculated polarization voltage of the battery 210 to the pulse generator 224.

The SOC estimating unit 227 stores the SOC characteristic curve according to the OCV and the temperature of the battery 210. The SOC estimating unit 227 may estimate the SOC corresponding to the OCV of the battery 210 transmitted from the voltage measuring unit 222 and the temperature of the battery 210 transmitted from the temperature measuring unit 223 by using the SOC characteristic curve.

The voltage measuring unit 222 may measure and transmit the OCV to the SOC estimating unit 227 after the polarization voltage reset period in which the polarization voltage reset pulse is applied for the battery 210. The OCV of the battery 210 is measured while the polarization voltage generated in the battery 210 is removed by the polarization voltage reset pulse, such that the OCV transmitted from the voltage measuring unit 222 to the SOC estimating unit 227 is the pure OCV that is not affected by the polarization voltage. Accordingly, the SOC estimating unit 227 may estimate a more accurate SOC of the battery 210 that is not affected by the polarization voltage.

In the embodiment shown in FIG. 2, the switching unit (or switch unit) 230 and the power converter 240 are not included in the battery management system 220, however at least one of the switching unit (or switch unit) 230 and the power converter 240 may be included in the battery management system 220.

Next, a method of removing the polarization voltage generated in the battery 210 according to the charge and discharge of the battery and a method estimating the SOC of the battery 210 will be described.

Figure 3:
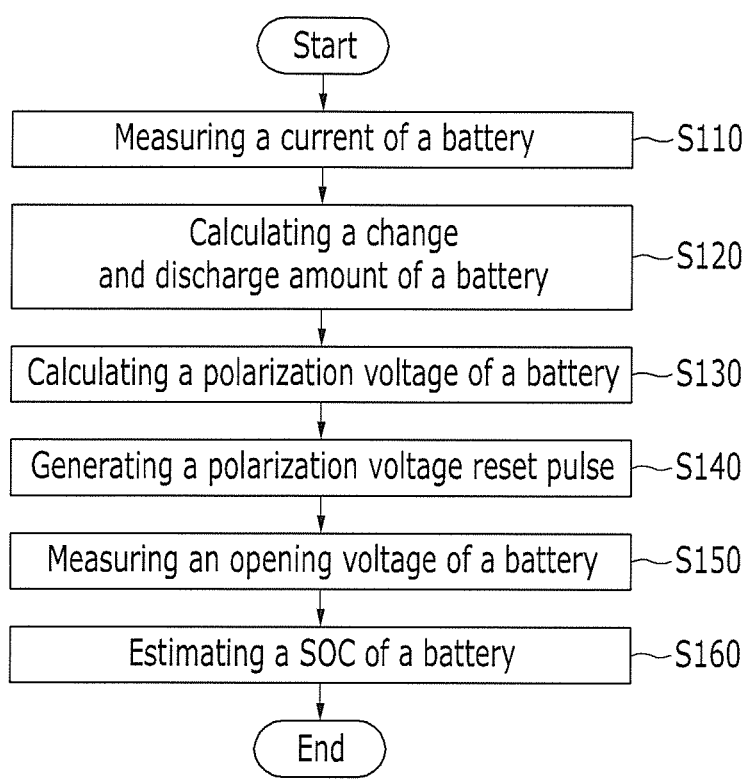
FIG. 3 is a flowchart of a battery charge state estimating method according to an exemplary embodiment of the present invention.
Figure 4:
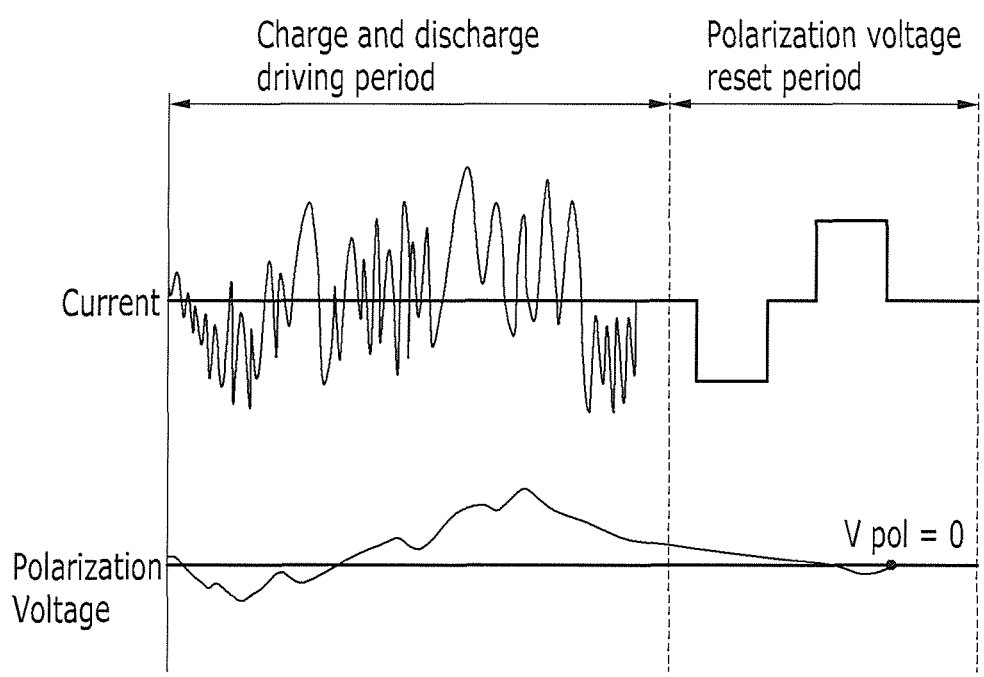
FIG. 4 is a waveform diagram to explain a method of removing a battery polarization voltage according to an exemplary embodiment of the present invention.

FIG. 3 is a flowchart of a battery charge state estimating method according to an exemplary embodiment of the present invention. FIG. 4 is a waveform diagram to explain a method of removing a battery polarization voltage according to an exemplary embodiment of the present invention.

Referring to FIGS. 2 to 4, the battery management system 220 may execute polarization voltage removing and SOC estimating according to the charge and discharge driving period and the polarization voltage reset period. The charge and discharge driving period is the activation period in which the charge or discharge is executed in the battery 210 while the switching unit (or switch unit) 230 is in a closed state. The polarization voltage reset period is a non-activation period in which the charge and discharge of the battery 210 is not executed while the switching unit (or switch unit) 230 is in an opened state.

The current measuring unit 221 measures the current flowing in the battery 210 in the charge and discharge driving period (S110). The current amount flowing in the battery 210 is not constant and may be increased and decreased as shown in FIG. 4. The current measuring unit 221 may sample the charge current flowing in the battery 210 as a positive value and the discharge current as a negative value. The current measuring unit 221 transmits the sampled charge current and discharge current to the charge and discharge amount calculator 225.

The charge and discharge amount calculator 225 calculates the charge and discharge amount of the battery 210 (S120). The charge and discharge amount calculator 225 calculates the difference between the charge current and the discharge current flowing in the battery 210 during the charge and discharge driving period to calculate the charge amount that is charged to or discharged from the battery 210. The charge and discharge amount calculator 225 may transmit the charge and discharge amount that is periodically calculated to the polarization voltage calculator 226. The charge and discharge amount calculator 225 may transmit the charge and discharge amount obtained during the charge and discharge driving period to the polarization voltage calculator 226 at the time when the charge and discharge driving period is finished, that is, the battery charge state estimating method is transitioned into the polarization voltage reset period.

The polarization voltage calculator 226 calculates the polarization voltage of the battery 210 (S130). Here, the temperature measuring unit 223 measures the temperature of the battery 210 to transmit it to the polarization voltage calculator 226. The polarization voltage calculator 226 may calculate the polarization voltage corresponding to the transmitted charge and discharge amount and the transmitted temperature of the battery 210 by using the polarization voltage characteristic curve.

A polarization voltage that is proportional to the difference between the charging amount and the discharging amount during the charge and discharge driving period is generated in the battery 210. As shown in FIG. 4, the polarization voltage is increased as a positive value when the battery 210 is charged during the charge and discharge driving period, and when the battery 210 is discharged, the polarization voltage is increased as a negative value. The polarization voltage that is charged according to the charge and discharge of the battery 210 remains when the charge and discharge driving period is finished.

The polarization voltage calculator 226 calculates the polarization voltage at the ending time of the charge and discharge driving period or the starting time of the polarization voltage reset period and transmits the calculated polarization voltage to the pulse generator 224.

The pulse generator 224 generates and transmits the polarization voltage reset pulse corresponding to the polarization voltage transmitted from the polarization voltage calculator 226 for the battery 210 (S140). The pulse generator 224 applies the negative polarization voltage reset pulse for a positive polarization voltage and the positive polarization voltage reset pulse for a negative polarization voltage, thereby removing the polarization voltage generated in the battery 210. The pulse generator 224 generates a plurality of polarization voltage reset pulses to remove the polarization voltage. A plurality of polarization voltage reset pulses may be generated by the combination of the positive polarization voltage reset pulse and the negative polarization voltage reset pulse. A plurality of polarization voltage reset pulses may be generated having a plurality of pulse widths. A plurality of polarization voltage reset pulses may be generated having a plurality of pulse magnitudes. A plurality of polarization voltage reset pulses may be generated having a pulse magnitude of two or more. A plurality of polarization voltage reset pulses may be generated having a plurality of pulse cycles.

After the polarization voltage of the battery 210 is removed by the polarization voltage reset pulse during the polarization voltage reset period, the voltage measuring unit 222 measures the OCV (or opening voltage) of the battery 210 (S150). The switching unit (or switch unit) 230 is in the opened state in the polarization voltage reset period such that the voltage measuring unit 222 may measure the OCV of the battery 210. The OCV of the battery 210 is measured after the polarization voltage is removed such that the OCV measured in the voltage measuring unit 222 is the pure OCV that is not affected by the polarization voltage. The voltage measuring unit 222 transmits the OCV of the battery 210 to the SOC estimating unit 227.

The SOC estimating unit 227 estimates the SOC of the battery 210 (S160). Here, the temperature measuring unit 223 measures the temperature of the battery 210 and transmits it to the SOC estimating unit 227. The SOC estimating unit 227 may estimate the SOC corresponding to the transmitted OCV and temperature of the battery 210 by using the SOC characteristic curve. The SOC estimating unit 227 uses the OCV from which the polarization voltage is removed, thereby estimating a more accurate SOC.

FIGS. 5A to 5E are waveform diagrams of types of polarization voltage reset pulses for removing a polarization voltage of a battery when charge and discharge of a battery are executed during a charge and discharge driving period according to an exemplary embodiment of the present invention.

Referring to FIGS. 5A to 5E, the positive polarization voltage reset pulse and the negative polarization voltage reset pulse may be applied for the battery during the polarization voltage reset period. Here, various suitable types of positive polarization voltage reset pulses and the negative polarization voltage reset pulses may be applied according to the pulse width, the pulse magnitude, or the pulse cycle.

Figure 5A:
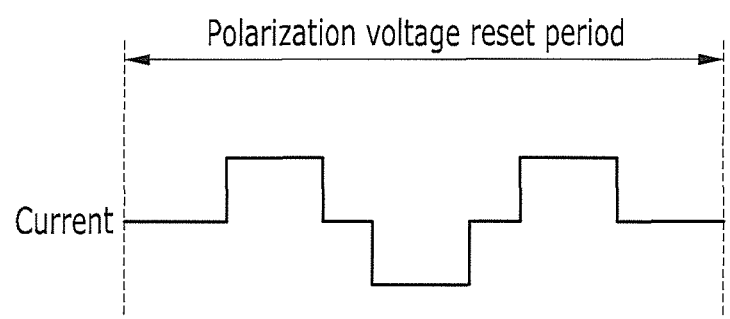
FIGS. 5A to 5E are waveform diagrams of types of polarization voltage reset pulses for removing a polarization voltage of a battery when charge and discharge of a battery are executed during a charge and discharge driving period according to an exemplary embodiment of the present invention.

As shown in FIG. 5A, the positive polarization voltage reset pulse and the negative polarization voltage reset pulse having a pulse width (e.g., a predetermined pulse width) and a magnitude (e.g., a predetermined magnitude) may be applied for the battery during the polarization voltage reset period.

Figure 5B:
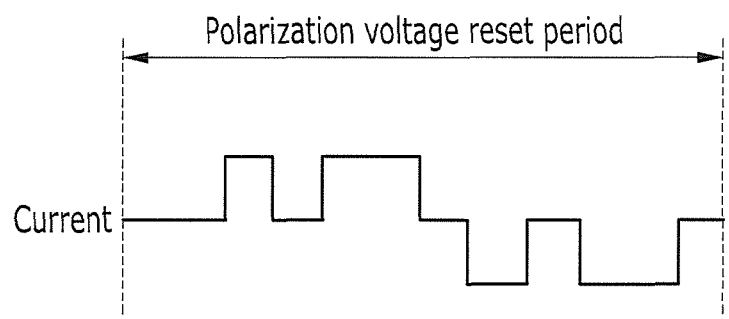

As shown in FIG. 5B, the positive polarization voltage reset pulse and the negative polarization voltage reset pulse having various suitable pulse widths may be applied for the battery during the polarization voltage reset period.

Figure 5C:
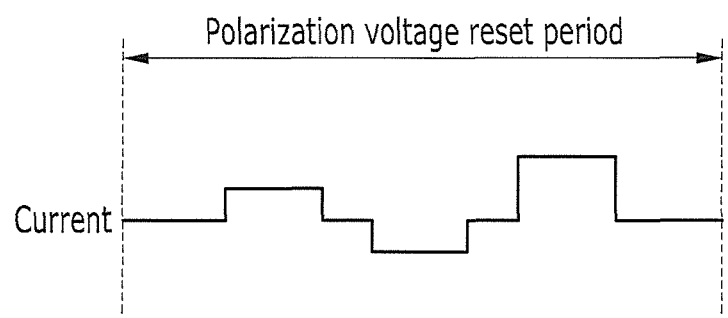

As shown in FIG. 5C, the positive polarization voltage reset pulse and the negative polarization voltage reset pulse having various suitable pulse magnitudes may be applied for the battery during the polarization voltage reset period.

Figure 5D:
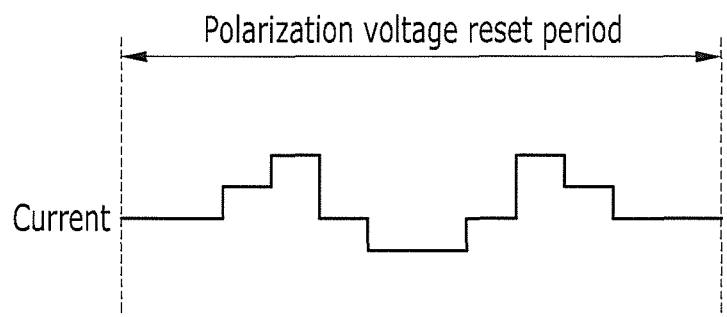

As shown in FIG. 5D, a plurality of polarization voltage reset pulses may be respectively generated having pulse magnitudes of two or more, and may be applied for the battery during the polarization voltage reset period.

Figure 5E:
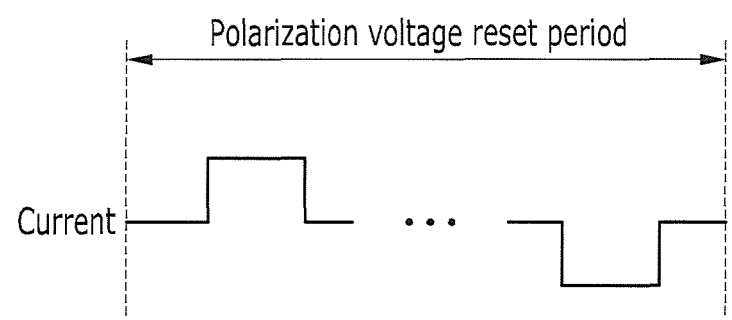

As shown in FIG. 5E, the pulse cycle in which the next polarization voltage reset pulse is applied after one polarization voltage reset pulse is applied during the polarization voltage reset period may be variously determined.

Figure 6:
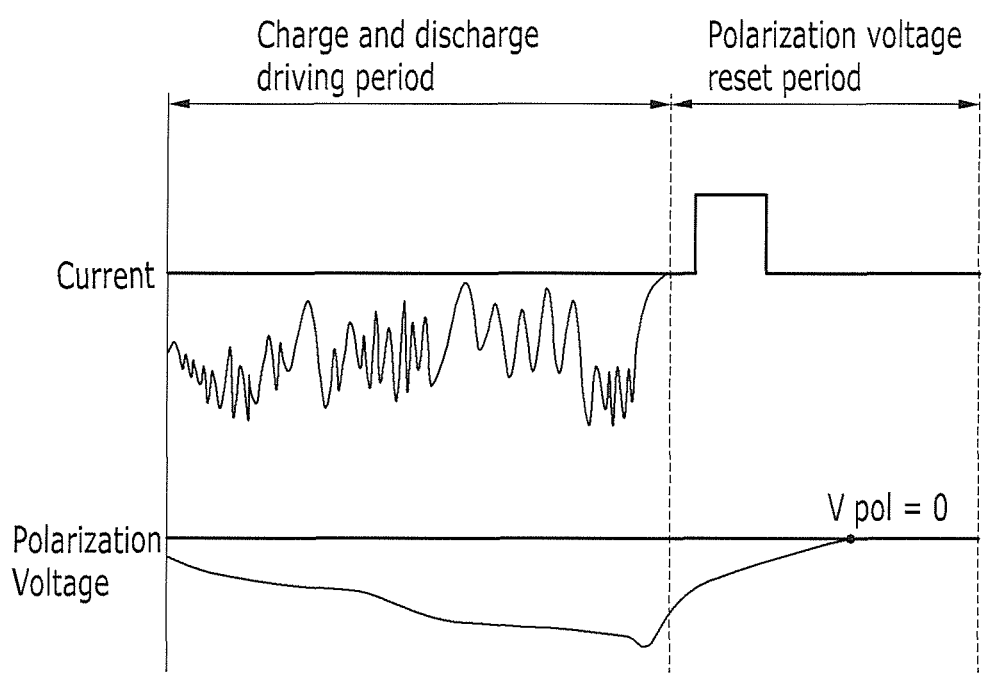
FIG. 6 is a waveform diagram to explain a method of removing a battery polarization voltage according to another exemplary embodiment of the present invention.

FIG. 6 is a waveform diagram to explain a method of removing a battery polarization voltage according to another exemplary embodiment of the present invention.

Referring to FIG. 6, the battery discharging may be executed only during the charge and discharge driving period. Accordingly, the polarization voltage of the battery during the charge and discharge driving period is increased as a negative value. In the polarization voltage reset period, a positive polarization voltage reset pulse to remove the negative polarization voltage is applied for the battery.

FIGS. 7A to 7E are waveform diagrams of types of polarization voltage reset pulse for removing a polarization voltage of a battery when discharging of a battery is executed during a charge and discharge driving period according to an exemplary embodiment of the present invention.

Referring to FIGS. 7A to 7E, the positive polarization voltage reset pulse may be applied for the battery during the polarization voltage reset period. Here, various suitable types of positive polarization voltage reset pulse may be applied according to the pulse width, the pulse magnitude, or the pulse cycle.

Figure 7A:
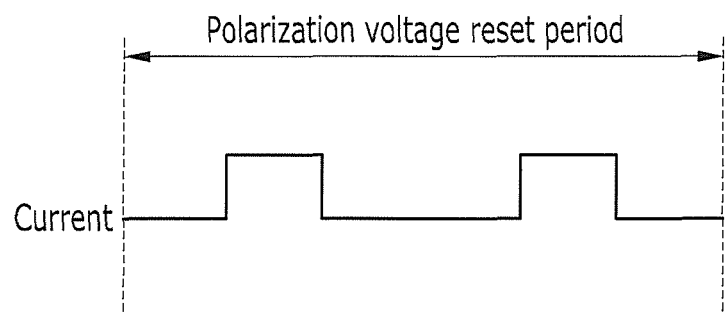
FIGS. 7A to 7E are waveform diagrams of types of polarization voltage reset pulses for removing a polarization voltage of a battery when discharging of a battery is executed during a charge and discharge driving period according to an exemplary embodiment of the present invention.

As shown in FIG. 7A, at least one positive polarization voltage reset pulse having a pulse width (e.g., a predetermined pulse width) and a magnitude (e.g., a predetermined magnitude) may be applied for the battery during the polarization voltage reset period.

Figure 7B:
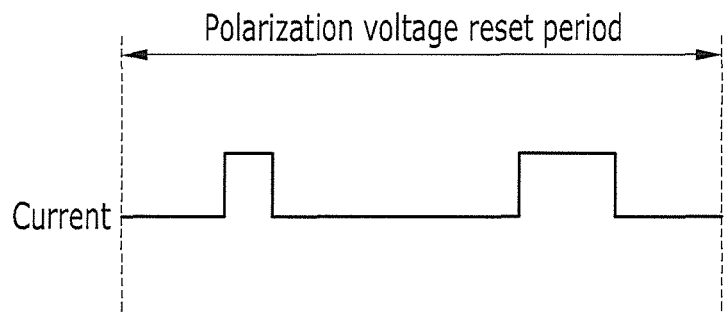

As shown in FIG. 7B, at least one positive polarization voltage reset pulse having various suitable pulse widths may be applied for the battery during the polarization voltage reset period.

Figure 7C:
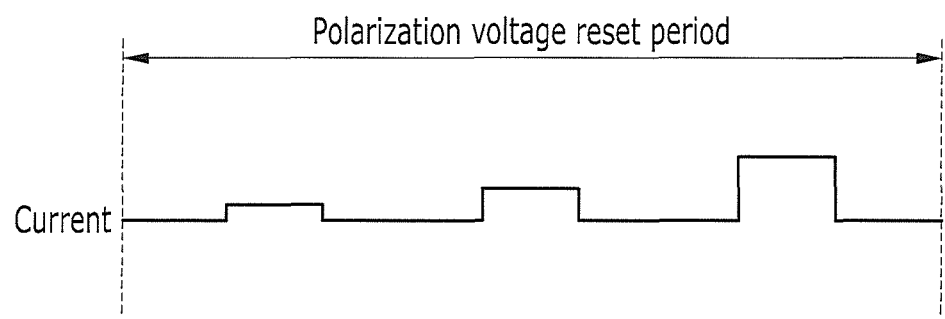

As shown in FIG. 7C, at least one positive polarization voltage reset pulse having various suitable pulse magnitudes may be applied for the battery during the polarization voltage reset period.

Figure 7D:
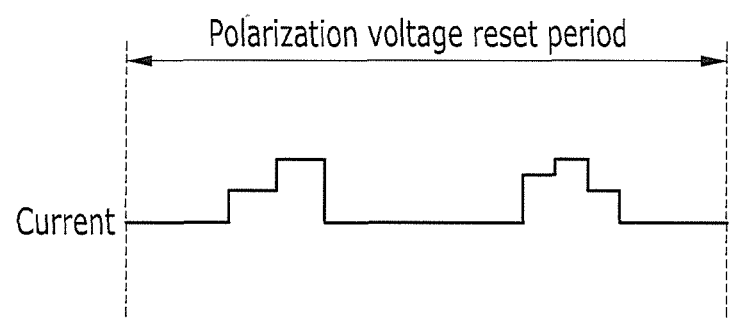

As shown in FIG. 7D, at least one positive polarization voltage reset pulse may be generated having a pulse magnitude of two or more, and may be applied for the battery during the polarization voltage reset period.

Figure 7E:
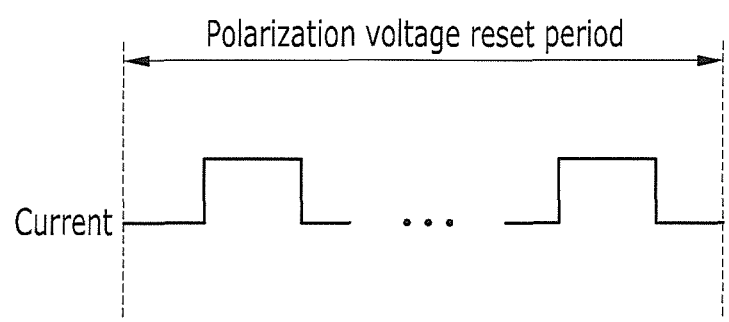

As shown in FIG. 7E, the pulse cycle in which the next positive polarization voltage reset pulse is applied after one positive polarization voltage reset pulse is applied during the polarization voltage reset period may be variously determined.

Figure 8:
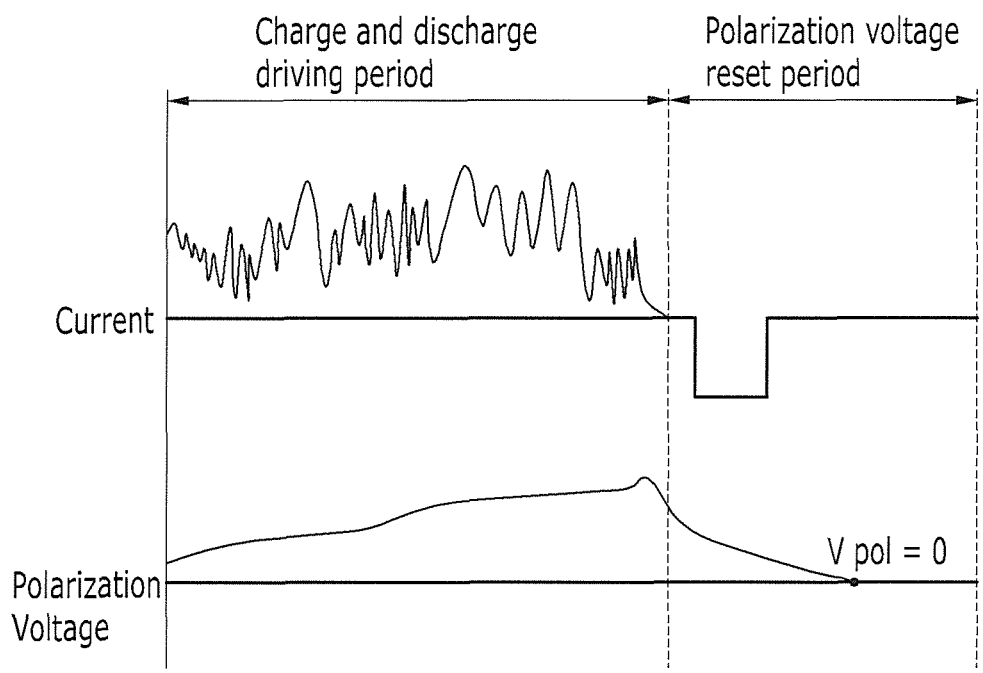
FIG. 8 is a waveform diagram to explain a method of removing a battery polarization voltage according to another exemplary embodiment of the present invention.

FIG. 8 is a waveform diagram to explain a method of removing a battery polarization voltage according to another exemplary embodiment of the present invention.

Referring to FIG. 8, the battery charging may be executed during the charge and discharge driving period. Accordingly, the polarization voltage of the battery is increased to a positive value during the charge and discharge driving period. In the polarization voltage reset period, the negative polarization voltage reset pulse to remove the positive polarization voltage is applied for the battery.

FIGS. 9A to 9E are waveform diagrams of types of polarization voltage reset pulses for removing a polarization voltage of a battery when charging of a battery is executed during a charge and discharge driving period according to an exemplary embodiment of the present invention.

Referring to FIGS. 9A to 9E, the negative polarization voltage reset pulse may be applied for the battery during the polarization voltage reset period. Here, various suitable types of negative polarization voltage reset pulse may be applied according to the pulse width, the pulse magnitude, or the pulse cycle.

Figure 9A:
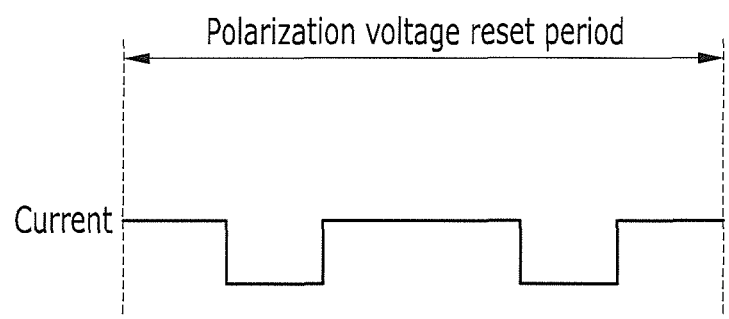
FIGS. 9A to 9E are waveform diagrams of types of polarization voltage reset pulses for removing a polarization voltage of a battery when charging of a battery is executed during a charge and discharge driving period according to an exemplary embodiment of the present invention.

As shown in FIG. 9A, at least one negative polarization voltage reset pulse having a pulse width (e.g., a predetermined pulse width) and a magnitude (e.g., a predetermined magnitude) may be applied for the battery during the polarization voltage reset period.

Figure 9B:
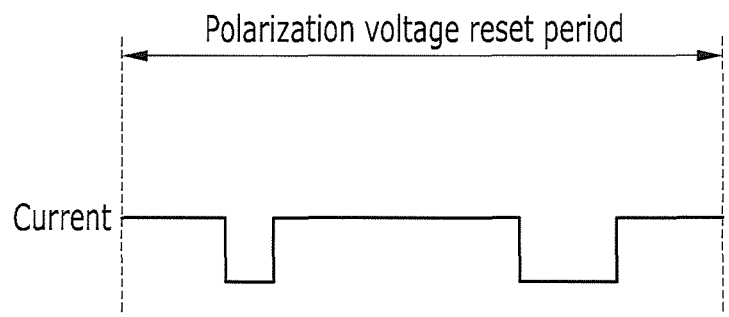

As shown in FIG. 9B, at least one negative polarization voltage reset pulse having various suitable pulse widths may be applied for the battery during the polarization voltage reset period.

Figure 9C:
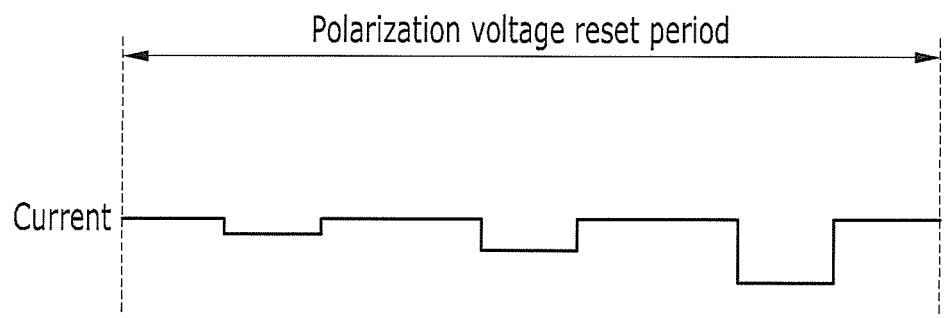

As shown in FIG. 9C, at least one negative polarization voltage reset pulse having various suitable pulse magnitudes may be applied for the battery during the polarization voltage reset period.

Figure 9D:
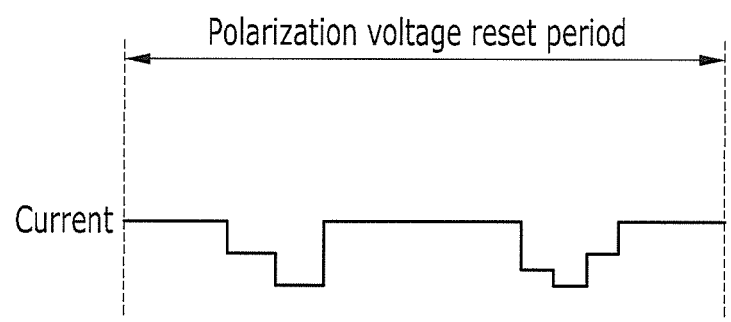

As shown in FIG. 9D, at least one negative polarization voltage reset pulse may be generated having a pulse magnitude of two or more, and may be applied for the battery during the polarization voltage reset period.

Figure 9E:
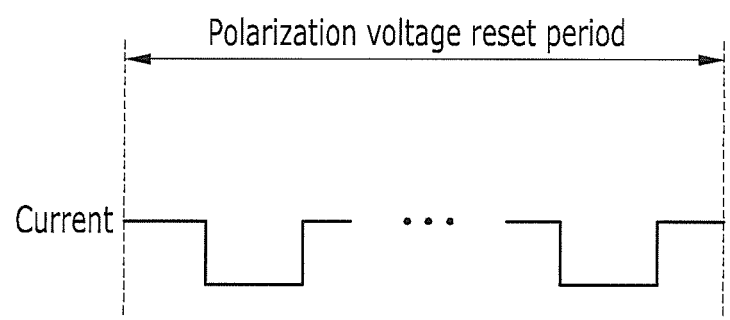

As shown in FIG. 9E, the pulse cycle in which various suitable negative polarization voltage reset pulses are applied after one negative polarization voltage reset pulse is applied during the polarization voltage reset period may be determined.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

DESCRIPTION OF SOME OF THE REFERENCE NUMERALS

210: battery
220: battery management system
230: switching unit (or switch unit)
240: power converter
221: current measuring unit
222: voltage measuring unit
223: temperature measuring unit
224: pulse generator
225: charge and discharge amount calculator
226: polarization voltage calculator
227: SOC estimating unit

What is claimed is:

1. A battery management system comprising:
a current measuring unit for sampling a charge current and a discharge current of a battery;
a charge and discharge amount calculator for calculating a charge and discharge amount corresponding to a difference between the sampled charge current and the sampled discharge current;
a polarization voltage calculator for calculating a polarization voltage corresponding to the charge and discharge amount and a temperature of the battery; and
a pulse generator for applying a polarization voltage reset pulse for the battery to remove the polarization voltage.

2. The battery management system of claim 1, wherein the charge and discharge amount calculator is configured to calculate the charge and discharge amount during a charge and discharge driving period in which charging or discharging of the battery is executed, and the pulse generator is configured to generate the polarization voltage reset pulse during a polarization voltage reset period after the charge and discharge driving period.

3. The battery management system of claim 2, further comprising
a voltage measuring unit for measuring an opening voltage of the battery after the polarization voltage reset period.

4. The battery management system of claim 3, further comprising
a state of charge (SOC) estimating unit for estimating a charge state according to the opening voltage and the temperature of the battery.

5. The battery management system of claim 4, further comprising
a temperature measuring unit for measuring and transmitting the temperature of the battery to the polarization voltage calculator and the SOC estimating unit.

6. The battery management system of claim 2, further comprising
a switching unit for coupling the battery and an external device during the charge and discharge driving period and uncoupling the battery and the external device during the polarization voltage reset period.

7. The battery management system of claim 1, further comprising
a power converter for converting a first device power into a charge power of the battery and for converting a discharge power of the battery into a second device power.

8. A method for removing a battery polarization voltage, the method comprising:
measuring a current flowing in a battery;
calculating a charge and discharge amount of the battery corresponding to a difference between a charge current and a discharge current flowing in the battery;
calculating a battery polarization voltage corresponding to the charge and discharge amount and a temperature of the battery; and
applying a polarization voltage reset pulse to remove the battery polarization voltage for the battery.

9. The method of claim 8, wherein
the current flowing in the battery is measured during a charge and discharge driving period in which charging or discharging is executed in the battery.

10. The method of claim 9, wherein
the charge and discharge amount of the battery is calculated at an ending time of the charge and discharge driving period.

11. The method of claim 8, wherein
the calculating of the polarization voltage comprises measuring the temperature of the battery.

12. The method of claim 8, wherein
the polarization voltage reset pulse is applied as a negative polarization voltage reset pulse when the battery polarization voltage is positive, and is applied as a positive polarization voltage reset pulse when the battery polarization voltage is negative.

13. The method of claim 8, wherein
the polarization voltage reset pulse is applied as a plurality of pulses.

14. The method of claim 13, wherein
the plurality of pulses are generated by applying at least one of a plurality of pulse widths, a plurality of pulse magnitudes, or a plurality of pulse cycles.

15. A method of estimating a battery charge state, the method comprising:
calculating a polarization voltage generated in the battery by calculating a charge and discharge amount of the battery during a charge and discharge driving period in which charging or discharging of the battery is executed;
applying a polarization voltage reset pulse for the battery to remove the polarization voltage during a polarization voltage reset period after the charge and discharge driving period; and
measuring an opening voltage of the battery during a non-activation period after the polarization voltage reset period, to estimate the battery charge state.

16. The method of claim 15, wherein
the polarization voltage reset pulse is applied as a negative polarization voltage reset pulse when the polarization voltage is positive, and is applied as a positive polarization voltage reset pulse when the polarization voltage is negative.

17. The method of claim 15, wherein
the polarization voltage reset pulse is applied as a plurality of pulses.

18. The method of claim 17, wherein
the plurality of pulses are generated by applying at least one of a plurality of pulse widths, a plurality of pulse magnitudes, or a plurality of pulse cycles.

* * * * *